(No Model.) 2 Sheets—Sheet 1.

A. W. HAAG.
TURBINE WATER WHEEL.

No. 557,802. Patented Apr. 7, 1896.

WITNESSES:
J. Nussblatt
Fred Acker

INVENTOR
A. W. Haag
BY Munn & Co
ATTORNEYS.

(No Model.)

A. W. HAAG.
TURBINE WATER WHEEL.

No. 557,802. Patented Apr. 7, 1896.

WITNESSES:
J. Nussblatt
Fredk Acker

INVENTOR
A. W. Haag
BY Munn & Co
ATTORNEYS.

UNITED STATES PATENT OFFICE.

ADAM W. HAAG, OF FLEETWOOD, PENNSYLVANIA.

TURBINE WATER-WHEEL.

SPECIFICATION forming part of Letters Patent No. 557,802, dated April 7, 1896.

Application filed October 29, 1895. Serial No. 567,277. (No model.)

*To all whom it may concern:*

Be it known that I, ADAM W. HAAG, of Fleetwood, in the county of Berks and State of Pennsylvania, have invented a new and useful Improvement in Turbine Water-Wheels, of which the following is a full, clear, and exact description.

My invention relates to an improvement in turbine water-wheels; and the object of the invention is to provide a turbine water-wheel in which the gates operating to stop or to start the wheel will be balanced, thus enabling the gates to be manipulated with practically little exertion on the part of the operator.

Another object of this invention is to provide a means for draining the float balancing the gates, so as to prevent the said float from becoming water-logged; and a further object of this invention is to provide a means whereby the gates may be simultaneously applied to all of the buckets of the wheel, and, furthermore, to so construct the gates that they may be made to close either the inlets or the outlets of the buckets, as occasion may demand, thus providing for a means of quickly stopping the rotation of the wheel in the event that the inlet to any of the buckets should become clogged by any object fed thereto.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
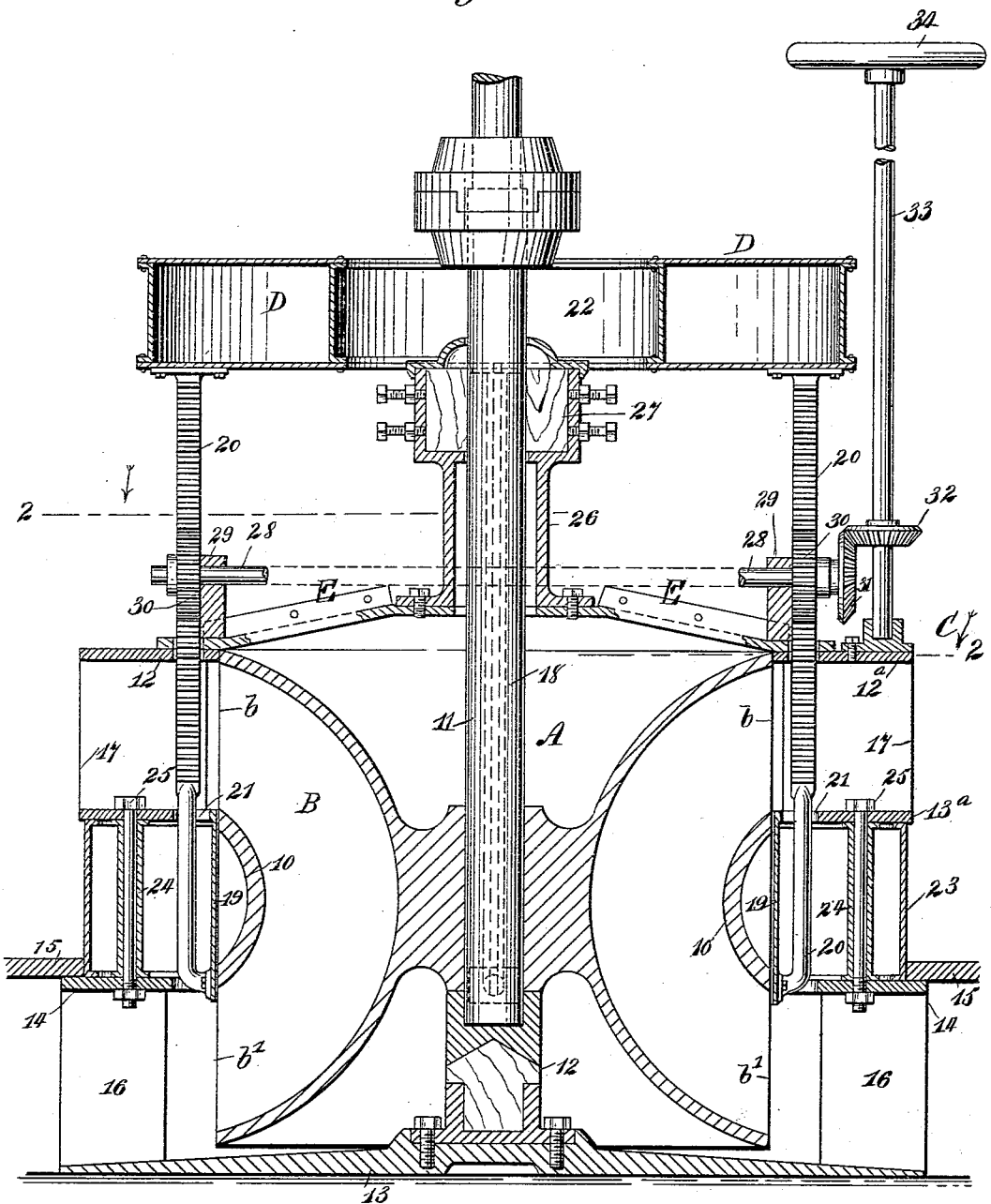
Figure 2:
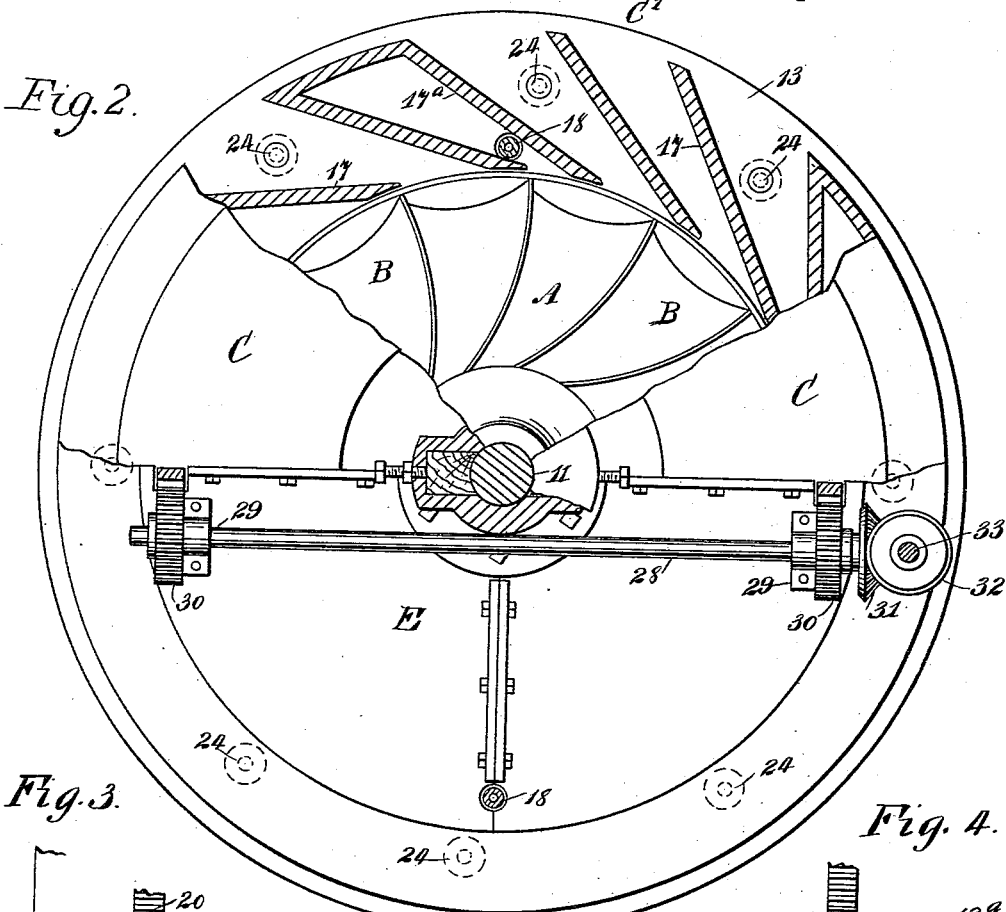
Figure 3:
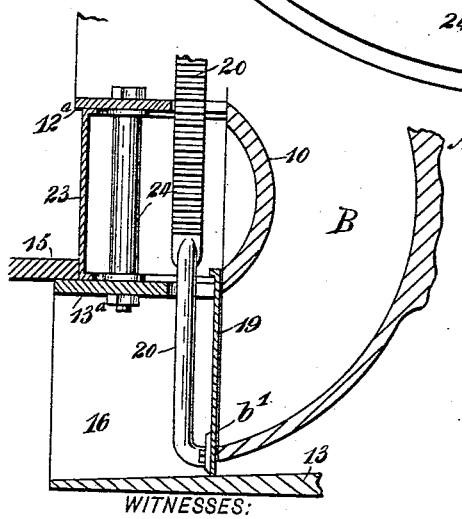
Figure 4:
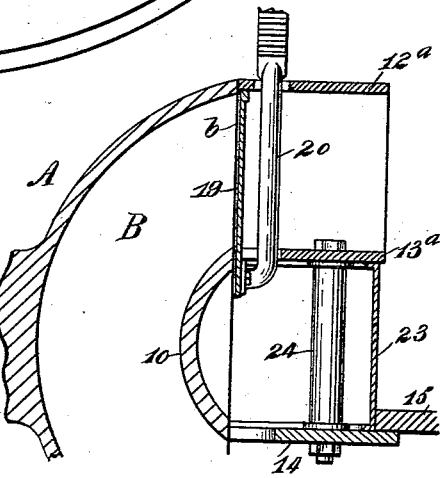

Figure 1 is a vertical section taken through the wheel. Fig. 2 is a partial plan view and vertical section of the wheel, the section being taken on the line 2 2 of Fig. 1. Fig. 3 is a detail sectional view illustrating the gate as closing the outlets of the wheel-buckets, and Fig. 4 is a similar view illustrating the gate as closing the inlets for the buckets of the wheel.

In carrying out the invention the wheel proper, A, is provided with a series of buckets B in its periphery, and these buckets are serpentine in arrangement or are diagonally disposed on the aforesaid periphery, extending from the top flange of the wheel substantially to the bottom flange, and a central belt 10 is made to surround the bucket-section of the wheel at or near the center thereof, the said belt being preferably inwardly curved, as shown in Fig. 1, whereby an inlet $b$ is provided and an outlet $b'$ for each bucket.

The wheel is secured to a vertical shaft 11, which is held to turn in suitable bearings 12, carried by a base-plate 13 or the equivalent thereof, and the wheel is surrounded by a casing C, which casing comprises an upper annular partition or ring $12^a$ and two intermediate partitions or rings $13^a$ and 14, spaced a predetermined distance apart, and the floor 15 of the penstock or casing is brought substantially level with the lower ring or partition 14, and the said lower ring or partition is supported from the base 13 by uprights 16, arranged at predetermined intervals apart, and the said uprights are made in the nature of plates, as shown in Fig. 1.

Between the upper of the intermediate rings $13^a$ and the upper partition or ring $12^a$ of the casing C a series of partitions 17 is located, arranged tangentially to the wheel, as shown in Fig. 2, and these partitions are so placed as to form inlet-buckets C', the buckets being spaced approximately the same distance apart as are the buckets B in the wheel, as is also shown in Fig. 2. Opposing partitions $17^a$ are of box-like construction, and through these partitions tubular rods 18 are carried from the delivery-compartment below the penstock upward a predetermined distance, and an annular gate 19 is made to surround the wheel A, which gate, when the wheel is in operation, is located, as shown in Fig. 1, at the division 10 between the outlet and the inlet.

The lower ends of preferably two racks 20, placed diametrically opposite, are secured to the lower portion of the aforesaid annular gate 19, having play in openings 21 made in the intermediate partitions $13^a$ and 14 of the casing C. The lower portion of the racks are plain, and the upper sections of the racks are toothed, being secured to the under face of a float D. This float is preferably made of metal and is provided with a central opening 22, through which the shaft 11 of the wheel is carried upward, and the float is adapted to be filled with air and is likewise connected with the tubular rods 18, the said rods extending upward through the float, being in communication with its interior, and these rods are adapted to receive any water that may collect in the float by reason of it leaking and of conducting the said water down into the space below the bottom 15 of the penstock or casing surrounding the wheel.

The intermediate partitions of the casing C are spaced by means of an annular band 23, as shown in Fig. 1, and the said intermediate partitions are connected at intervals by means of tubular pillars 24 and bolts 25 passed through the same, as is likewise shown in Fig. 1.

A cover E is erected over the top of the wheel, being preferably attached to the upper section 12 of its surrounding casing C, and the said cover is provided with suitable openings through which the guide-rods 18 may be extended and likewise the racks 20. This cover is preferably made in sections, four sections being preferably employed, as shown in Fig. 2, and the sections are united by flanges suitably bolted together. An opening is made in the central portion of the cover, through which the axle 11 of the wheel extends, and a sleeve 26 is secured upon the said cover around said opening adapted to support an upper bearing 27 for the wheel-shaft 11. A shaft 28 is journaled in suitable bearings 29, located on the said cover, and this shaft is made to carry pinions 30, meshing with the toothed portions of the racks 20, and the shaft likewise carries at one of its extremities a beveled gear 31, which meshes with a similar gear 32, secured to a vertical shaft 33, which shaft is journaled at its lower end, usually upon the casing C immediately surrounding the wheel, and is provided with a hand-wheel 34 or its equivalent at its upper end, the upper end of the shaft extending through the penstock or surrounding casing or jacket for the wheel.

In the operation of this wheel the float D is made of suitable capacity to perfectly balance the annular gate 19 and the operative mechanism connected therewith, so that the least possible exertion on the part of the operator is required in manipulating the said gate. The gate is capable of moving upward, so as to close the inlets b of the wheel-buckets, or it may be carried downward below the bottom of the penstock to close the outlet of the wheel, and under this construction of the wheel a wheel-pit is not required, since the discharge of water will be made immediately below the floor of the penstock.

It is evident that by manipulating the shifting-shaft 33 the racks may be carried upward or downward, so as to close either end of the wheel-buckets. This arrangement is particularly advantageous, since, if any obstruction should enter the inlets of the buckets preventing the annular gate from being manipulated at that point, the gate may be carried downward, so as to close the outlets of the wheel-buckets and thus instantly stop the wheel.

The box-like partitions 17$^a$ in the construction of the casing C immediately surrounding the wheel are provided as a protection for the tubular rods 18, which serve as guides for the float in addition to their function of delivering water therefrom.

Having thus described my invention, I claim as new and desire to secure by Letters Patent—

1. In a turbine wheel, a wheel provided with diagonal buckets, a casing immediately surrounding the said wheel at its bucket portion, an annular gate held to slide over the inlet or the outlet of the said buckets, a float connected with the said gate, counterbalancing the same, and means for raising and lowering the gate, as and for the purpose set forth.

2. In a turbine water-wheel, a wheel provided with a series of buckets in its periphery, a partition circumferentially located on the wheel, dividing said buckets into inlet and outlet sections, a gate substantially of the width of the said divisions and having sliding movement, being capable of covering the inlets and outlets of the aforesaid wheel-buckets, a float counterbalancing the said gate, racks connecting the float with the gate, a shaft, and a gear connection between said shaft and the said racks, whereby said gate may be raised or lowered together with its counterbalancing-float, as and for the purpose specified.

3. In a turbine water-wheel, a gate adapted to close the outlets or the inlets of the wheel-buckets, a float connected with the gate and counterbalancing the same, a shifting-shaft, and a rack-and-pinion connection between the said shaft, the float and the gate, substantially as shown and described.

4. The combination of a turbine water-wheel having inlet and outlet openings, a gate capable of movement to cover either of said openings, and means for moving the gate, substantially as described.

5. In a water-motor, the combination of a turbine wheel having an annular belt forming inlet and outlet openings in the wheel, a casing surrounding the inlet-openings and having tangentially-disposed walls forming passages leading to said openings, a gate capable of movement to close either the inlet or outlet openings of the turbine wheel, and means for moving the gate, substantially as described.

ADAM W. HAAG.

Witnesses:
ALBERT F. BURKHART,
JOHN A. HAAG.